T. F. WARD.
SAW SET.
APPLICATION FILED MAR. 27, 1909.

947,287.

Patented Jan. 25, 1910.

Inventor
T. F. Ward.

Witnesses

By

Attorney

UNITED STATES PATENT OFFICE.

TIMOTHY F. WARD, OF FAYETTEVILLE, NORTH CAROLINA.

SAW-SET.

947,287.  Specification of Letters Patent.  Patented Jan. 25, 1910.

Application filed March 27, 1909. Serial No. 486,117.

*To all whom it may concern:*

Be it known that I, TIMOTHY F. WARD, citizen of the United States, residing at Fayetteville, in the county of Cumberland and State of North Carolina, have invented certain new and useful Improvements in Saw-Sets, of which the following is a specification.

This invention relates to saw-setting devices of that type having an anvil for the saw teeth to rest on while they are adjusted by a hammer.

The object of the invention is to provide an improved device of the kind stated, characterized particularly by improved means for holding the saw teeth, and for adjusting the holder for saws of different diameters— the device being intended for use with circular saws.

A further object of the invention is to make a convenient portable machine or device of the type indicated.

The invention is illustrated in the accompanying drawings in which—

Figure 1:
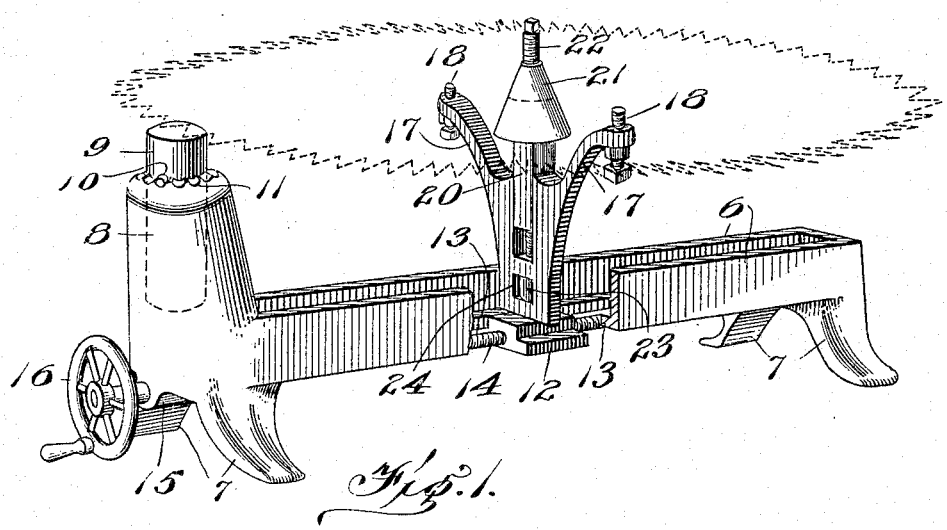
Figure 2:
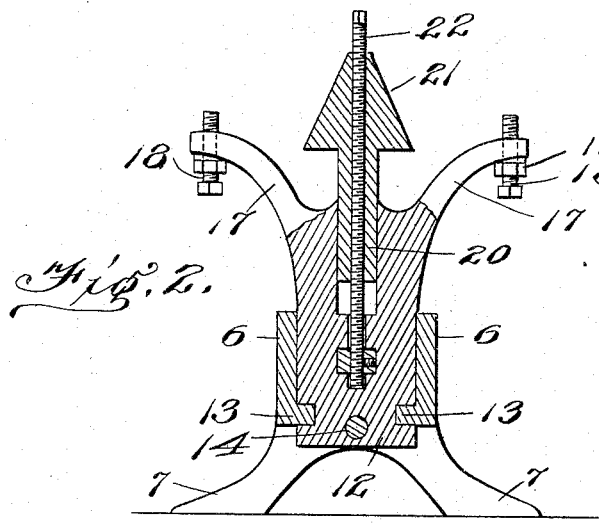

Figure 1 is a perspective view of the implement, the saw being indicated in dotted lines. Fig. 2 is a vertical cross section through the holder which supports the saw.

Referring specifically to the drawings, the base of the device has parallel sides or slide-ways 6, supported at opposite ends by legs 7, and having at one end a hollow stock 8 with a pocket in the top which receives the anvil, 9, said anvil consisting of a cylindrical piece of metal with a beveled or inclined top. The anvil has at one side a pin 10 which rests in any one of a series of notches 11 formed around the top of the stock, so as to hold the anvil at any desired angle according to the set desired, the face of the anvil being beveled off on all sides from the center, and more at some places than at others, so the saw teeth can be set as desired, the anvil being held in position so that the set of all teeth is uniform. The holder for the saw consists of a block 12 slidably mounted between the guides 6, which have flanges 13 which are received in grooves in the sides of the block 12.

The holder is moved along the guides, toward and from the anvil, by means of a non-traveling screw 14 which works through a lug 15 on the under side of the base, under the stock, and has a hand wheel 16 for its operation. The block 12 has two upwardly and laterally projecting arms 17 which form supports or rests for the saw, being provided with adjusting screws 18 held by lock nuts 19, the points of said screws being presented upwardly so that the under side of the saw may rest thereon. In the upper part of the block 12, between the arms 17 is a squared recess formed to receive the squared shank 20 of a centering cone 21 which fits in the eye of the saw when the latter is placed thereon. The cone and its shank have a threaded longitudinal bore through which extends a screw 22 the lower end of which is rotatably mounted in the block 12 and held in place by a collar 23 thereon, the collar fitting in a recess 24 in the block. The top of the screw is squared to receive a wrench.

In use, the saw is placed on the holder with its eye over the cone, and the holder is adjusted by the screw 14 to bring the tooth of the saw to proper position on the anvil, the set screws 18 being adjusted to level the saw and the cone being adjusted up or down to exactly fit the eye when the saw is in proper position, the adjustment of the cone being effected by turning the screw 22. The saw may then be turned on the cone and the teeth hammer on the anvil to the desired set, in the usual manner. The pin and notch engagement of the anvil allows a different set to be applied to different saws, but nevertheless holds the anvil to the same position during each operation.

I claim:

1. A saw set having a stock with a socket therein and notches around the socket, and an anvil which may be turned in the socket, the face of the anvil being beveled to different angles at different places, and a pin projecting from the side of the anvil and arranged to engage in a selected notch to hold the anvil as set.

2. A saw set comprising a base, an anvil at one end thereof, a saw holder adjustable along the base and consisting of a block having opposite arms and a non-circular recess between said arms, a non-rotatable cone having a shank fitting in said recess and movable up and down therein, and a screw rotatably mounted in the block and extending through the cone, to raise and lower the same.

In testimony whereof, I affix my signature in presence of two witnesses.

TIMOTHY F. WARD.

Witnesses:
    THOMAS W. SHAW,
    CLYDE R. VANCE.